United States Patent Office 3,537,085
Patented Oct. 27, 1970

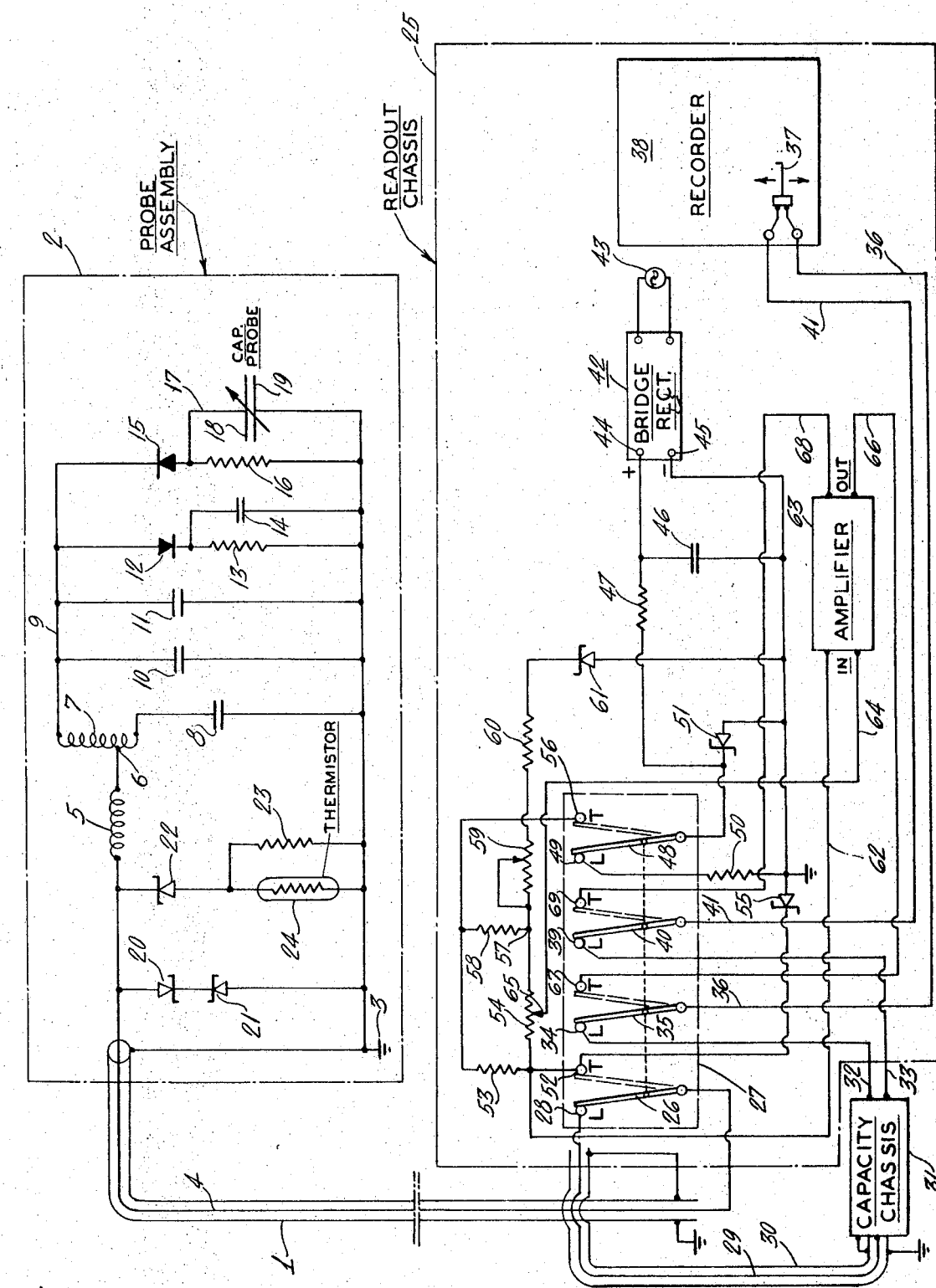

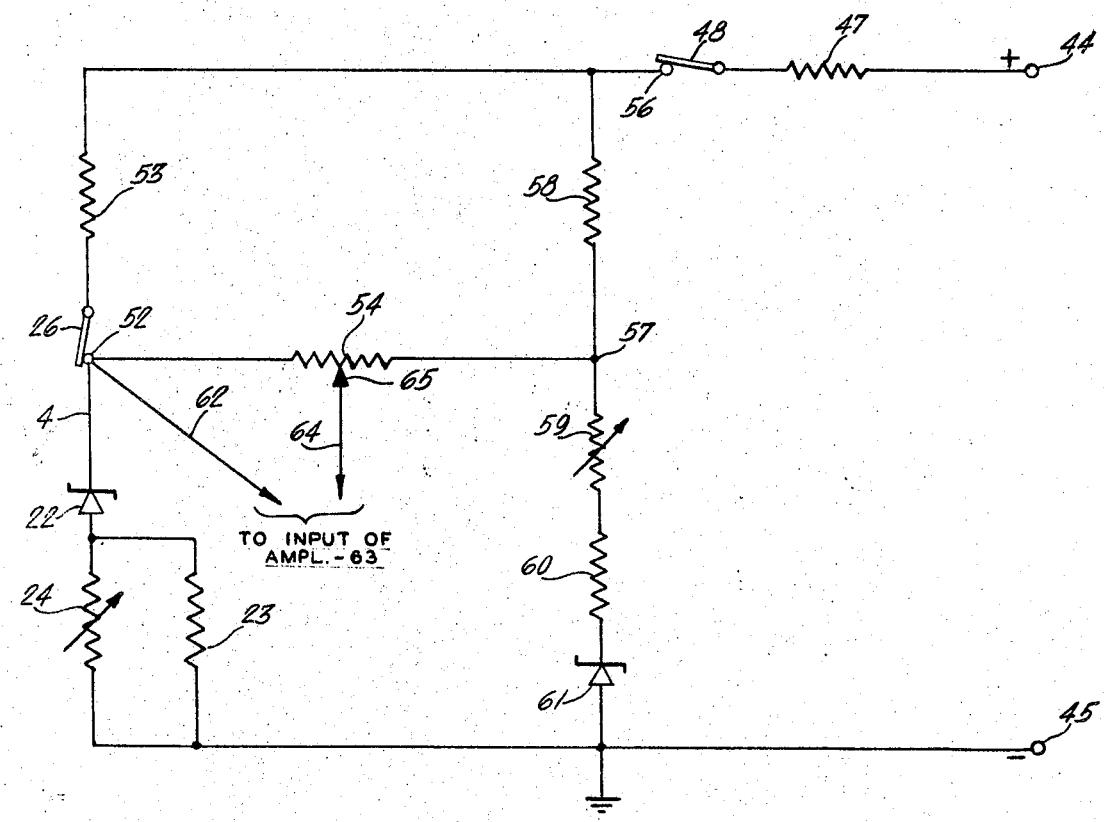

3,537,085
SWITCHING CIRCUIT FOR CAVERN PROBE
Robert Mayer, Ardmore, and Elbert N. Shawhan, West Chester, Pa., assignors to Sun Oil Company, Philadelphia, Pa., a corporation of New Jersey
Filed Jan. 11, 1968, Ser. No. 697,170
Int. Cl. G08c 19/10, 19/04, 19/30
U.S. Cl. 340—182
12 Claims

ABSTRACT OF THE DISCLOSURE

A probe assembly useful in subterranean storage caverns includes a liquid-level sensor and a temperature sensor. By means of a switching circuit at the surface, these two sensors are rendered operative alternatively, thereby to enable selective measurement of either liquid level or temperature in the cavern.

---

This invention relates to a switching circuit for a probe assembly useful in subterranean storage caverns.

For accounting purposes, it is desirable to provide apparatus for gauging or measuring liquid level in various types of hydrocarbon storage receptacles such as subterranean caverns. The apparatus of this invention has particular utility in connection with subterranean caverns and will be described in connection therewith; however, it is pointed out that it may also have utility in connection with other types of storage receptacles such as aboveground storage tanks. In addition to the measurement of liquid level (which enables a volume determination to be made), it is desired to ascertain the temperature of the stored product at the time the volume determination is made, so that the measured volume may be converted to the volume at a standard temperature such at 60° F.

An object of this invention is to provide measuring apparatus for storage receptacles which can be used either for the measurement of liquid level in the receptacle or for the measurement of temperature in the receptacle.

Another object is to provide measuring apparatus for hydrocarbon storage receptacles which can be alternatively utilized for the measurement of liquid level in the receptacle or of temperature in the receptacle.

A further object is to provide apparatus of the type described in the preceding paragraph wherein the selection of the two alternatives is carried out at the "local" or recording location.

A still further object is to provide measuring apparatus for subterranean caverns which can be selectively utilized to measure either liquid level in the cavern or temperature in the cavern, without the necessity of carrying out any switching at the "remote" or cavern unit.

The objects of this invention are accomplished, briefly, in the following manner: A probe assembly for subterranean hydrocarbon storage caverns includes both a capacitive-type liquid level sensor and a temperature senor, the latter being thermally coupled to the ambient surrounding the assembly. The liquid level sensor and the temperature sensor are connected into circuit with various electrical components to form a "remote unit" which is mounted in the probe assembly, closely adjacent the two sensors; this remote unit is connected by means of a coaxial cable to a switching unit located at the surface. The switching unit has a two-position switch (one position for "level" and one for "temperature"), this switch in the "level" position connecting the remote unit to an alternating current "capacity chassis" and in the "temperature" position connecting the remote unit to a direct current bridge circuit. A common recorder pen is utilized in both positions of the switch.

A detailed description of the invention follows, taken in conjunction with the accompanying drawings, wherein:

FIG. 1 is a schematic drawing of a switching circuit according to the invention; and FIG. 2 is a simplified circuit diagram illustrating one mode of operation according to the invention.

Referring now to FIG. 1, the components inside the dotted-line box labeled "probe assembly" are connected to the "remote" end of a coaxial cable 1. The "probe assembly" is denoted generally by numeral 2. By way of example, when the apparatus of this invention is being used in a subterranean cavern the probe assembly 2 is located within the cavern and is connected to the lower end of cable 1, this cable then being utilized to both electrically and mechanically connect the probe assembly to the surface. The mechanical construction and arrangement of the remote probe assembly 2 is disclosed in detail in the copending Lerner application, Ser. No. 676,848, filed Oct. 20, 1967, which ripened on Nov. 11, 1969 into Pat. No. 3,477,290.

The sheath of coaxial cable 1 is grounded at 3. The central conductor 4 of cable 1 is connected through a choke 5 (which may typically have an inductance value of 500 microhenries) to a tap point 6 near one end of a high-Q transformer winding 7, so as to provide an autotransformer coupling of conductor 4 to winding 7. One end of winding 7 is coupled to ground through a capacitor 8, while the end of winding 7 more remote from point 6 is connected to a line 9. Between this line and ground two capacitors 10 and 11 are connected in parallel. Between line 9 and ground 3 a diode 12 is connected in series with the parallel arrangement of a resistor 13 and a capacitor 14. Also connected between the line 9 and ground is a diode 15 in series with the parallel arrangement of a resistor 16 and the capacitance provided by the connection 17 to one probe element 18 associated with a second probe element 19, both of these probe elements normally (i.e., during liquid-level measurement operation) extending through the level of the liquid (in the cavern) to be measured. As described in the aforementioned application, the probe elements 18 and 19 (probe element 19 being grounded) are spaced to serve as the plates of a condenser between which the level of the cavern liquid rises or falls to provide a varying capacitance as a measure of the liquid level, the cavern liquid thus serving as a dielectric between such condenser plates. It will be noted that the diodes 12 and 15 are oppositely poled with respect to the line 9 and ground.

The probe elements 18 and 19 have a length which is short compared to the range of liquid levels to be measured, which is to say that the length of these probe elements is short compared to the height of the cavern. The capacitive probe 18, 19 is preferably moved up and down automatically to follow the liquid level in the cavern, the movement up and down of the probe being in increments or steps. The follow-up arrangement (for causing the probe to follow the cavern liquid level) is not shown herein, since it has nothing to do with the present invention; a suitable follow-up arrangement is disclosed in the copending Mayer et al. application, Ser. No. 694,226, filed Dec. 28, 1967, issued on Oct. 21, 1969 as Pat. No. 3,473,380.

The liquid-level-measuring circuitry described up to this point, in connection with the probe assembly 2, is generally similar to the "tank assembly" circuitry shown in Shawhan Pat. No. 3,073,160.

Between the central conductor 4 of cable 1 and ground there is provided a protective arrangement comprising a pair of Zener diodes 20 and 21 series-connected back-to-back. The combination of diodes 20 and 21 provides a fifteen volt limiting or protecting action across the coaxial cable 1. Also connected between the conductor 4 and ground is a 6.4 volt Zener diode 22 in series with the parallel arrangement of a resistor 23 and a thermistor 24. The thermistor 24 is used as the temperature sensor of the probe assembly 2, and is thermally coupled to the ambient surrounding the probe assembly. The mechanical arrangement of the thermistor 24 in the probe assembly 2, so as to have this characteristic, is described in the aforementioned Lerner application. The thermistor 24 is of the conventional type, and in the circuit to be described may be considered as a resstor whose resistance value varies with the temperature thereof.

The coaxial cable 1 extends from the remote probe assembly 2 (ordinarily located in the subterranean cavern) to the surface, and thence to a "readout chassis" denoted generally by numeral 25. The connection of the probe assembly 2 to the "local" readout chassis 25 by means of the coaxial cable 1 is disclosed in detail in the aforementioned Lerner and Mayer et al. applications. At the readout chassis 25 (which contains the components inside the dotted-line box so legended as well as other components not of interest herein but disclosed in the aforementioned Mayer et al. application), the central conductor 4 of cable 1 is connected to a first one 26 of the four movable contacts of a four-pole double-throw switch dented generally by numeral 27. One of the "throws" of switch 27 is indicated by the letter L (for "level"), and the other by the letter T (for temperature). Switch 27 is illustrated in FIG. 1 in solid lines in the L position, and in phantom lines in the T position. Thus, the first movable contact 26 of switch 27 is illustrated in solid lines on its L fixed contact 28. One end of the central conductor 29 of a piece of coaxial cable 30 (whose outer sheath is grounded) is connected to switch contact 28, and the other end of conductor 29 is connected to a capacity chassis 31, the connection of cable 30 to the capacity chassis being made in the same manner as is the connection of the coaxial cable to the "local" apparatus (exclusive of the "tank assembly") in the above Shawhan patent. The capacity chassis 31 employs circuitry quite similar to that disclosed in the said Shawhan patent.

As disclosed in said Shawhan patent, the capacity chassis 31 includes an oscillator having a relatively high frequency nd low voltage output (on the order of 75 kHz., for example, and less than 6.4 volts) which is fed via cables 30 and 1 (and via switch contacts 28 and 26, when switch 27 is in the solidlne "level" position illustrated) to the remote probe asembly 2. Also, a switching voltage (for example, approximately 5 volts at about 5 Hz.) is fed via these same two cables to the probe assembly 2 when selector switch 27 is in the L or "level" position. The switching voltage so fed effects a switching action which causes, during one half-cycle of this voltage, one of the diodes (12 or 15) to conduct and the other to be cut off, while during the next half-cycle the reverse occurs. Consequently, the high frequency signal fed to the "remote unit" of probe assembly 2 is affected, during successive half-cycles, alternately by the fixed capacitor 14 or the variable capacitor 18, 19. The result is a modulated high frequency wave which is fed via cables 1 and 30 (and via switch contacts 26 and 28) to the capacity chassis 31. The unit 31 functions to produce across its output leads 32, 33 a signal voltage proportional to the capacitance sensed by sensors 18, 19, and hence proportional to the level of the cavern liquid wherein this sensor is located.

The diode 22 (as well as the diodes 20 and 21) in effect provides an open circuit at the value of high frequency voltage present at the probe assembly 2 when selector switch 27 is in the L position. Thus, the thermistor branch 24, 23 is effectively out of the circuit under these conditions. Similarly, for the switching voltage the diode 22 (as well as the diodes 20 and 21, obviously) in effect provides an open circuit at the value of this voltage present, so that the switching voltage is effectively eleminated from or kept out of the thermisor branch circuit 24, 23. The protective diode arrangement 20, 21 serves to shunt to ground any voltages of fifteen volts or higher which might appear at the "remote" end of cable 1, thus keeping such voltages away from the other electrical components of the remote unit 2.

The capacity chassis output lead 32 is connected to the L contact 34 for the second movable contact 35 of switch 27. Movable contact 35 is connected by means of a lead 36 to the "red" pen 37 of a two-pen recorder 38 (the "blue" pen of which is not shown) which forms a part of the readout chassis 25. The capacity chassis output lead 33 is connected to the L contact 39 for the third movable contact 40 of switch 27. Movable contact 40 is connected by means of a lead 41 to the "red" pen 37.

As previously stated, variations in cavern liquid level cause variations in the effective capacitance of sensor 18, 19, resulting in variations of the output signal between leads 32 and 33. These output signal variations cause the recorder pen 37 to move with respect to the clockwork-driven chart of the recorder 38. In this way, the cavern liquid level is indicated by pen 37 on the recorder chart. (All of the above assumes, of course, that the switch 27 is in its L or "level" position, indicated by solid lines in FIG. 1.)

A bridge rectifier 42 is energized from a conventional 115 volt, 60 Hz. alternating current source 43, this rectifier having a positive unidirectional voltage output terminal 44 and a negative output terminal 45, which latter is grounded. A large filtering capacitor 46 is connected between terminals 44 and 45, and a dropping resistor 47 is connected between terminal 44 and the fourth movable contact 48 of switch 27. From the L contact 49 for movable contact 48, a resistor 50 is connected to terminal 45. Resistor 50 thus provides a load across the output terminals of rectifier 42 when switch 27 is in the L position. A 14.6 volt Zener diode 51 is connected from the junction of resistor 47 and movable contact 48, to terminal 45; this diode provides a regulating action for the direct current output of rectifier 42, and prevents this output from rising above 14.6 volts.

The description up to this point has covered the circuit operation for the measurement of liquid level. When it is desired to measure the temperature sensed by the temperature sensor or thermistor 24 (which may be the temperature of the vapor above the cavern liquid, or any temperature gradient within the cavern liquid), the switch 27 is moved to its T or "temperature" position, which is indicated in phantom lines in FIG. 1. In connection with the parenthetical matter in the preceding sentence, it is desired to be pointed out that the thermistor 24 is mechanically mounted in the probe assembly (as described in the previously-mentioned Lerner application), and moves therewith; also, the probe assembly may be moved to various locations in the cavern by suitable manipulation of various switches at the surface, as described in the previously-mentioned Mayer et al. application.

In general, it may be stated that when switch 27 is moved to its T position, the parallel combination of the temperature-responsive resistor (thermistor) 24 and the fixed resistor 23, at the remote unit or probe assembly 2, is connected into a Wheatstone bridge circuit energized from rectifier 42; this enables the resistance value of thermistor 24 (and hence the temperature at such thermistor) to be measured automatically and recorded.

When movable contact 26 of switch 27 is moved to its T contact 52, the central conductor 4 of cable 1 is disconnected from the capacity chassis 31 and is instead connected to the common junction of a fixed precision resistor 53 and a potentiometric "span" resistor 54. A fifteen volt Zener diode 55 is connected from contact 52 to ground, for protecting or limiting purposes.

As previously indicated, one end of resistor 53 is connected to one end of resistor 54. The other end of resistor 53 is connected to the T fixed contact 56 for the fourth movable contact 48 of switch 27, and thus (when contact 48 is on T contact 56) to the positive D.C. voltage supply point (which is the common junction of resistor 47 and diode 51). The other end of resistor 54 is connected to a point 57, and between this latter point and switch contact 56 there is connected a precision resistor 58 which is equal in value to resistor 53. From point 57 to ground, there are connected in series a potentiometric "zero" resistor 59 which is connected as a simple variable resistor, a fixed resistor 60, and a 6.4 volt Zener diode 61. It may be noted that, between cable conductor 4 and ground, the diode 22 is connected in series with the parallel combination of thermistor 24 and resistor 23. The thermistor 24 and the resistor 23 are of the same order of magnitude.

Refer now to FIG. 2, which is a simplified diagram of the circuit arrangement just described, as established when the switch 27 is in its T or "temperature" position. It may be seen that a Wheatstone bridge circuit is set up, wherein the bridge is energized from rectifier 42, whose D.C. output terminals 44 and 45 are connected across a first diagonal of the bridge. A first arm of the four-arm bridge comprises the resistor 53. The circuit values (including the values of the resistors and the voltage of D.C. source 42) are such that there is a voltage of about seven volts at contact 52, this voltage being in excess of the voltage required to cause diode 22 to have a very low value of resistance. The second arm of the bridge is made up of diode 22 in series with the parallel combination of thermistor 24 and resistor 23. The third arm of the bridge comprises the resistor 58, while the fourth arm is made up of the series combination of the variable resistor 59, the fixed resistor 60, and the Zener diode 61 (which, like diode 22, also has a very low resistance under these conditions). In accordance with known Wheatstone bridge theory, the voltage across the second diagonal of the bridge is dependent upon (among other things) the value of resistance of the variable resistor (thermistor) 24, and this latter value of resistance depends in a known manner upon the temperature of the thermistor. The points 52 and 57 define the ends of the second diagonal of the Wheatstone bridge circuit. The potentiometric resistor 54 is connected between points 52 and 57.

A lead 62 is connected from contact 52 to the input of an amplifier module 63, while the other input lead 64 for this amplifier is connected to the slider 65 of potentiometric resistor 54. Thus, a portion (to wit, the voltage between point 52 and slider 65) of the voltage between the diagonal points 52 and 57 is fed to the input of amplifier 63.

One of the output leads 66 of amplifier 63 is connected to the fixed T contact 67 for the second movable contact 35 of switch 27; when contact 35 is on this T contact 67, lead 66 is connected to lead 36 and thus to the "red" recorder pen 37. The other output lead 68 of amplifier 63 is connected to the fixed T contact 69 for the third movable contact 40 of switch 27; when contact 40 is on this T contact 69, lead 68 is connected to lead 41 and thus to the "red" recorder pen 37. Thus, in the T position of switch 27, the output of amplifier 63 (whose input, as previously stated, is taken from the Wheatstone bridge) is fed to the "red" recorder pen 37. In this T position of selector switch 27, therefore, the temperature sensed by the temperature sensor 24 is recorded as degrees Fahrenheit by the "red" recorder pen 37, on the chart of recorder 38.

Since direct current is used for the temperature measurement, the capacitors 8, 10, and 11 (which cannot pass direct current) do not affect the temperature measurement, even though these capacitors are in effect coupled to the second arm of the Wheatstone bridge. The diode 15 is so poled that it presents in effect an open-circuit to the direct current. The diode 12 allows the direct current to pass through resistor 13 when a temperature measurement is being made, but this resistor is taken into account when the temperature measurement circuit is being calibrated. Thus, even though resistor 13 is in the temperature measuring circuit, its effect on the temperature reading is cancelled out.

The invention claimed is:

1. An arrangement for selectively measuring liquid level or temperature at a remote point comprising a sensor assembly located at said point, said assembly including a liquid-level sensor and a temperature sensor; an electrical connection coupling said sensor assembly to apparatus located at a local point; said apparatus including a detecting means for said liquid-level sensor having an input and an output; an electrical channel for said temperature sensor having an input side and an output side; an indicating means; and a two-position switching device operating in one position thereof to couple said electrical connection to the input of said detecting means and to couple the output of said detecting means to said indicating means and operating in its other position to couple said electrical connection to the input side of said channel and to couple the output side of said channel to said indicating means.

2. Arrangement according to claim 1, wherein said indicating means comprises a pen operating on the chart of a recorder.

3. Arrangement according to claim 1, wherein said liquid-level sensor comprises a capacitive-type probe.

4. Arrangement according to claim 1, wherein said temperature sensor comprises a temperature-sensitive resistor.

5. Arrangement according to claim 1, wherein said liquid-level sensor requires high frequency excitation current for its operation, and wherein said detecting means supplies such current thereto in said one position of said switching device.

6. Arrangement as defined in claim 1, including also a source of direct current in said apparatus, and connections controlled by said switching device for supplying direct current from said source to said temperature sensor in said other position of said switching device.

7. Arrangement according to claim 1, wherein said liquid-level sensor comprises a capacitive-type probe, wherein said temperature sensor comprises a temperature-sensitive resistor, and wherein said detecting means comprises a pen operating on the chart of a recorder.

8. Arrangement defined in claim 1, wherein said temperature sensor comprises a temperature-sensitive resistor; said arrangement including also an array of resistors in said apparatus arranged to form three arms of a Wheatstone bridge, and connections controlled by said switching device for connecting said temperature-sensitive resistor as the fourth arm of said bridge in said other position of said switching device.

9. Arrangement in accordance with claim 8, including also a source of direct current in said apparatus, and connections controlled by said switching device for supplying direct current from said source to said bridge as a supply voltage therefor in said other position of said switching device.

10. Arrangement defined in claim 1, wherein said liquid-level sensor requires a low frequency switching voltage for its operation, and wherein said detecting means supplies such voltage thereto in said one position of said switching device; said assembly including also means for preventing the switching voltage from reaching said temperature sensor.

11. Arrangement according to claim 1, wherein said channel comprises an amplifier whose input and output provide said channel input side and said channel output side, respectively.

12. Arrangement according to claim 1, wherein said switching device comprises a multipole, double-throw switch whose two throws provide said two positions for the switching device.

References Cited

UNITED STATES PATENTS 2,942,112 6/1960 Hearn _____ 340—182
3,072,160 1/1963 Shawhan.

THOMAS B. HABECKER, Primary Examiner

U.S. Cl. X.R.

340—177, 200, 210; 73—292, 344, 304